United States Patent
Roh et al.

(10) Patent No.: US 7,859,801 B2
(45) Date of Patent: Dec. 28, 2010

(54) CONTROL APPARATUS FOR LINEAR COMPRESSOR

(75) Inventors: Chulgi Roh, Changwon-si (KR);
Jong-Kwon Kim, Changwon-si (KR);
Jung-Wook Bae, Changwon-si (KR);
Hee-Dong Kang, Chungcheongnam-do (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 12/087,983

(22) PCT Filed: Jan. 16, 2007

(86) PCT No.: PCT/KR2007/000272

§ 371 (c)(1),
(2), (4) Date: Jan. 21, 2009

(87) PCT Pub. No.: WO2007/089083

PCT Pub. Date: Aug. 9, 2007

(65) Prior Publication Data

US 2009/0206778 A1    Aug. 20, 2009

(30) Foreign Application Priority Data

| Feb. 2, 2006 | (KR) | ...................... 10-2006-0010264 |
| Feb. 2, 2006 | (KR) | ...................... 10-2006-0010266 |
| Feb. 2, 2006 | (KR) | ...................... 10-2006-0010267 |
| Feb. 2, 2006 | (KR) | ...................... 10-2006-0010269 |

(51) Int. Cl.
*H02H 7/08* (2006.01)

(52) U.S. Cl. ............................. 361/22; 361/30; 361/23; 417/44.1; 417/45; 417/1; 417/274; 417/280; 417/287; 62/228.1; 62/230; 323/220; 323/226; 323/273; 323/282; 323/219

(58) Field of Classification Search .................... 361/29, 361/23, 1, 31, 63, 30, 22; 318/434, 783, 318/432; 62/228.1, 228.5, 230; 323/220, 323/226, 273, 282, 219
See application file for complete search history.

(56) References Cited

U.S. PATENT DOCUMENTS

| 4,291,258 | A | * | 9/1981 | Clark et al. ................. 318/124 |
| 4,604,563 | A | | 8/1986 | Min |
| 4,751,450 | A | | 6/1988 | Lorenz et al. |
| 6,040,679 | A | | 3/2000 | Monk et al. |
| 6,077,054 | A | * | 6/2000 | Lee et al. ..................... 417/417 |

(Continued)

FOREIGN PATENT DOCUMENTS

EP         0 054 446       6/1982

(Continued)

*Primary Examiner*—Rita Leykin
(74) *Attorney, Agent, or Firm*—McKenna Long & Aldridge LLP (57) ABSTRACT

The present invention discloses a control apparatus for a linear compressor which can vary a cooling force and prevent an inrush current. The control apparatus for the linear compressor includes a coil winding body laminated on the linear compressor, a first capacitor connected in series to the coil winding body, a capacitance varying unit being formed in a parallel structure to the first capacitor, and having a capacitor switch, and a control unit for inducing an output change of the linear compressor, by varying the whole capacitance of the control apparatus by controlling the capacitor switch.

19 Claims, 7 Drawing Sheets

U.S. PATENT DOCUMENTS

| | | | |
|---|---|---|---|
| 6,289,680 B1 * | 9/2001 | Oh et al. | 62/6 |
| 6,514,047 B2 * | 2/2003 | Burr et al. | 417/53 |
| 6,623,246 B2 * | 9/2003 | Hwang et al. | 417/44.1 |
| 6,657,408 B2 * | 12/2003 | Goto et al. | 318/442 |
| 6,715,301 B2 * | 4/2004 | Song | 62/6 |
| 6,747,428 B1 * | 6/2004 | Kwon et al. | 318/434 |
| 6,844,698 B1 * | 1/2005 | Kwon et al. | 318/778 |
| 6,934,141 B2 * | 8/2005 | Hamano et al. | 361/160 |
| 7,385,368 B2 * | 6/2008 | Hong et al. | 318/434 |
| 2002/0064463 A1 | 5/2002 | Park et al. | |
| 2003/0034761 A1 * | 2/2003 | Goto et al. | 323/282 |
| 2003/0209015 A1 * | 11/2003 | Song | 62/6 |
| 2006/0153688 A1 * | 7/2006 | Lee et al. | 417/44.1 |

FOREIGN PATENT DOCUMENTS

| | | |
|---|---|---|
| EP | 0 772 277 | 5/1997 |
| JP | 60-032583 | 2/1985 |
| KR | 92-5625 | 3/1992 |
| KR | 10-2003-0088554 | 11/2003 |
| KR | 10-2005-0082886 | 8/2005 |
| WO | WO 2005/006520 | 1/2005 |

* cited by examiner

CONTROL APPARATUS FOR LINEAR COMPRESSOR

This application claims priority to International application No. PCT/KR2007/000272 filed on Jan. 16, 2007 which claims priority to Korean Application No. 10-2006-0010264 filed Feb. 2, 2006, Korean Application No. 10-2006-0010266 filed Feb. 2, 2006, Korean Application No. 10-2006-0010267 filed Feb. 2, 2006, and Korean Application No. 10-2006-0010269 filed Feb. 2, 2006, all of which are incorporated by reference, as if fully set forth herein.

TECHNICAL FIELD

The present invention relates to a linear compressor, and more particularly, to a control apparatus for a linear compressor which can vary a cooling force and prevent an inrush current.

BACKGROUND ART

In general, a compressor is a mechanical apparatus for raising a pressure, by receiving power from a power generation apparatus such as an electric motor or turbine, and compressing the air, refrigerants or other various operation gases. The compressor has been widely used for an electric home appliance such as a refrigerator and an air conditioner, or in the whole industry.

The compressors are roughly classified into a reciprocating compressor in which a compression space for sucking or discharging an operation gas is formed between a piston and a cylinder, and the piston is linearly reciprocated inside the cylinder, for compressing refrigerants, a rotary compressor in which a compression space for sucking or discharging an operation gas is formed between an eccentrically-rotated roller and a cylinder, and the roller is eccentrically rotated along the inner wall of the cylinder, for compressing refrigerants, and a scroll compressor in which a compression space for sucking or discharging an operation gas is formed between an orbiting scroll and a fixed scroll, and the orbiting scroll is rotated along the fixed scroll, for compressing refrigerants.

Normally, the linear compressor sucks, compresses and discharges the refrigerants by using a linear driving force of a motor, and is divided into a compression unit including a cylinder and a piston for compressing the refrigerant gas, and a driving unit including a linear motor for supplying the driving force to the compression unit.

In detail, in the linear compressor, the cylinder is fixedly installed in a hermetic container, and the piston is linearly reciprocated in the cylinder. As the piston is linearly reciprocated inside the cylinder, the refrigerants are supplied into a compression space in the cylinder, compressed and discharged. A suction valve assembly and a discharge valve assembly are installed in the compression space, for controlling suction and discharge of the refrigerants according to an inner pressure of the compression space.

The linear motor for generating the linear driving force is connected to the piston. In the linear motor, an inner stator and an outer stator formed by laminating a plurality of laminations in the circumferential direction are installed around the cylinder with a predetermined gap, a coil (or coil winding body) is wound around the inner stator or the inner portion of the outer stator, and a permanent magnet is installed in the gap between the inner stator and the outer stator and connected to the piston.

The permanent magnet is movable in the motion direction of the piston. The permanent magnet is linearly reciprocated in the motion direction of the piston by an electromagnetic force generated when a current flows through the coil. The linear motor is operated at a constant operating frequency $f_c$, and the piston is linearly reciprocated at a predetermined stroke S.

Figure 1:
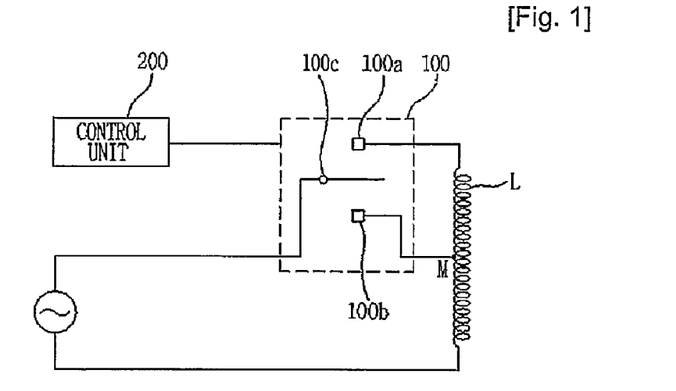
FIG. 1 is a circuit view illustrating a conventional control apparatus for a linear compressor.

FIG. 1 is a circuit view illustrating a conventional control apparatus for a linear compressor. Referring to FIG. 1, the control apparatus includes a coil winding body L wound in the circumferential direction of the linear compressor, for receiving power, a branch means 100 for applying power to the part or whole of the coil winding body L, and a control unit 200 for controlling the branch means 100 to control a cooling force according to a load.

In detail, a power supply source is connected to one end of the coil winding body L, and a connection terminal 100a of the branch means 100 is formed at the other end of the coil winding body L. A connection terminal 100b is connected to a middle point M (or a branch line of the middle point L) of the coil winding body L. The branch means 100 includes a switching element 100c for applying power to the connection terminal 100a or 100b by the control of the control unit 200.

The control unit 200 performs a power mode of applying power to the part of the coil winding body L in order to output a high cooling force in an overload of a freezing cycle, and performs a saving mode of applying power to the whole coil winding body L in order to output a low cooling force or a middle cooling force in a low load or mid load of the freezing cycle. For the power mode, the control unit 200 connects the switching element 100c of the branch means 100 to the connection terminal 100b. For the saving mode, the control unit 200 connects the switching element 100c of the branch means 100 to the connection terminal 100a.

In the above-described linear compressor, the linear motor is operated, in a load considered in the design, at an operating frequency $f_c$ identical to a natural frequency $f_n$ of the piston computed by using a mechanical spring constant $K_m$ of a coil spring and a gas spring constant $K_g$ of a gas spring. Accordingly, the linear motor is operated in the power mode only in the load considered in the design to improve efficiency.

Since the load is actually variable, the gas spring constant $K_g$ of the gas spring and the natural frequency $f_n$ of the piston computed by using the same are changed.

In detail, in the design, the operating frequency $f_c$ of the linear motor is set to be equalized to the natural frequency $f_n$ of the piston in the mid load region. Even if the load is varied, the linear motor is operated at the constant operating frequency $f_c$. However, the natural frequency $f_n$ of the piston increases with the increase of the load.

$$f_n = \frac{1}{2\pi}\sqrt{\frac{K_m + K_g}{M}} \quad \text{Formula 1}$$

Here, $f_n$ represents the natural frequency of the piston, $K_m$ and $K_g$ represent the mechanical spring constant and the gas spring constant, respectively, and M represents the mass of the piston.

In the design, since the ratio of the gas spring constant $K_g$ in the total spring constant $K_T$ is small, the gas spring constant $K_g$ is not considered or is set to have a constant value. In addition, the mass M of the piston and the mechanical spring constant $K_m$ have constant values. Therefore, the natural frequency $f_n$ of the piston is computed as a constant value by the above formula 1.

Actually, as the load increases, the pressure and temperature of the refrigerants increase in the limited space. As a result, the gas spring constant $K_g$ increases due to the increase of an elastic force of the gas spring itself, and the natural frequency $f_n$ of the piston proportional to the gas spring constant $K_g$ also increases.

In the conventional art, in the case that the control unit 200 controls the switching element 100c, an electric energy accumulated in the coil winding body L is operated to generate an inrush current.

If the applied power is varied, such variation changes the output of the linear compressor regardless of the control of the control unit 200. If the power is excessively applied, the linear compressor undergoes an overload or performs an abnormal operation. That is, the linear compressor is not normally operated.

The conventional control apparatus for the linear compressor as shown in FIG. 1 controls the operating frequency $f_c$ without considering the natural frequency $f_n$ of the piston or movable member varied according to the gas spring constant $K_g$. Even though the output of the linear compressor can be varied according to the cooling force of the load, the resonant frequency of the linear compressor is not kept. As a result, efficiency of the linear compressor decreases. Moreover, the efficiency and cooling force of the linear compressor are considerably changed due to variation of the externally-applied power. It is a fatal problem in the operation of the linear compressor.

DISCLOSURE OF INVENTION

Technical Problem

The present invention is achieved to solve the above problems. An object of the present invention is to provide a control apparatus for a linear compressor which can control an output by varying the whole capacitance and prevent an inrush current.

Technical Solution

Another object of the present invention is to provide a control apparatus for a linear compressor which can prevent an inrush current by controlling a power on/off switch of the linear compressor in variation of a capacitance.

Yet another object of the present invention is to provide a control apparatus for a linear compressor which can prevent increase or decrease of an output by variation of applied power.

Yet another object of the present invention is to provide a control apparatus for a linear compressor which can prevent the linear compressor from undergoing an overload or performing an abnormal operation due to the excessively-applied power.

Yet another object of the present invention is to provide a control apparatus for a linear compressor which can vary an operation of the linear compressor (high cooling force operation, low cooling force operation, etc.), and prevent generation of an inrush current.

Yet another object of the present invention is to provide a control apparatus for a linear compressor which can vary an output according to a load, regardless of variation of the externally-applied power.

Yet another object of the present invention is to provide a control apparatus for a linear compressor which can generate a plurality of outputs by changing a size of constant power applied to a coil according to a requested output.

Yet another object of the present invention is to provide a control apparatus for a linear compressor which can generate a plurality of outputs by changing a size of constant power and a length of a coil receiving the constant power.

In order to achieve the above-described objects of the invention, there is provided a control apparatus for a linear compressor, including: a coil winding body laminated on the linear compressor; a first capacitor connected in series to the coil winding body; a capacitance varying unit being formed in a parallel structure to the first capacitor, and having a capacitor switch; and a control unit for inducing an output change of the linear compressor, by varying the whole capacitance of the control apparatus by controlling the capacitor switch.

In another aspect of the present invention, there is provided a control apparatus for a linear compressor, including: a coil winding body laminated on the linear compressor; a first capacitor connected in series to the coil winding body; a capacitance varying unit formed in a parallel structure to the first capacitor; a voltage sensing unit for sensing a both end voltage of at least one of the first capacitor and the capacitance varying unit; and a control unit for inducing an output change of the linear compressor according to a load, by varying the whole capacitance of the control apparatus by controlling the capacitance varying unit according to the voltage sensed by the voltage sensing unit.

In yet another aspect of the present invention, there is provided a control apparatus for a linear compressor, including: a coil winding body laminated on the linear compressor; a first capacitor having its one end connected in series to the coil winding body; a capacitance varying unit formed in a parallel structure to the first capacitor; a voltage and frequency sensing unit for sensing a voltage and a frequency of applied power; and a control unit for inducing an output change of the linear compressor by varying the whole capacitance of the control apparatus, by computing a mode voltage by a function of the voltage and the frequency of the applied power from the voltage and frequency sensing unit and controlling the capacitance varying unit according to the mode voltage.

In yet another aspect of the present invention, there is provided a control apparatus for a linear compressor, including: a coil winding body laminated on the linear compressor; a capacitor connected in series to the coil winding body; a constant power supply unit for receiving external power, converting the power into a specific size of constant power, and applying the constant power to the coil winding body; and a control unit for inducing an output change of the linear compressor according to a load, by controlling the constant power supply unit to supply the specific size of constant power to the coil winding body.

BRIEF DESCRIPTION OF THE DRAWINGS

The present invention will become better understood with reference to the an accompanying drawings which are given only by way of illustration and thus are not limitative of the present invention, wherein.

MODE FOR THE INVENTION

A control apparatus for a linear compressor in accordance with the preferred embodiments of the present invention will now be described in detail with reference to the accompanying drawings.

Figure 2:
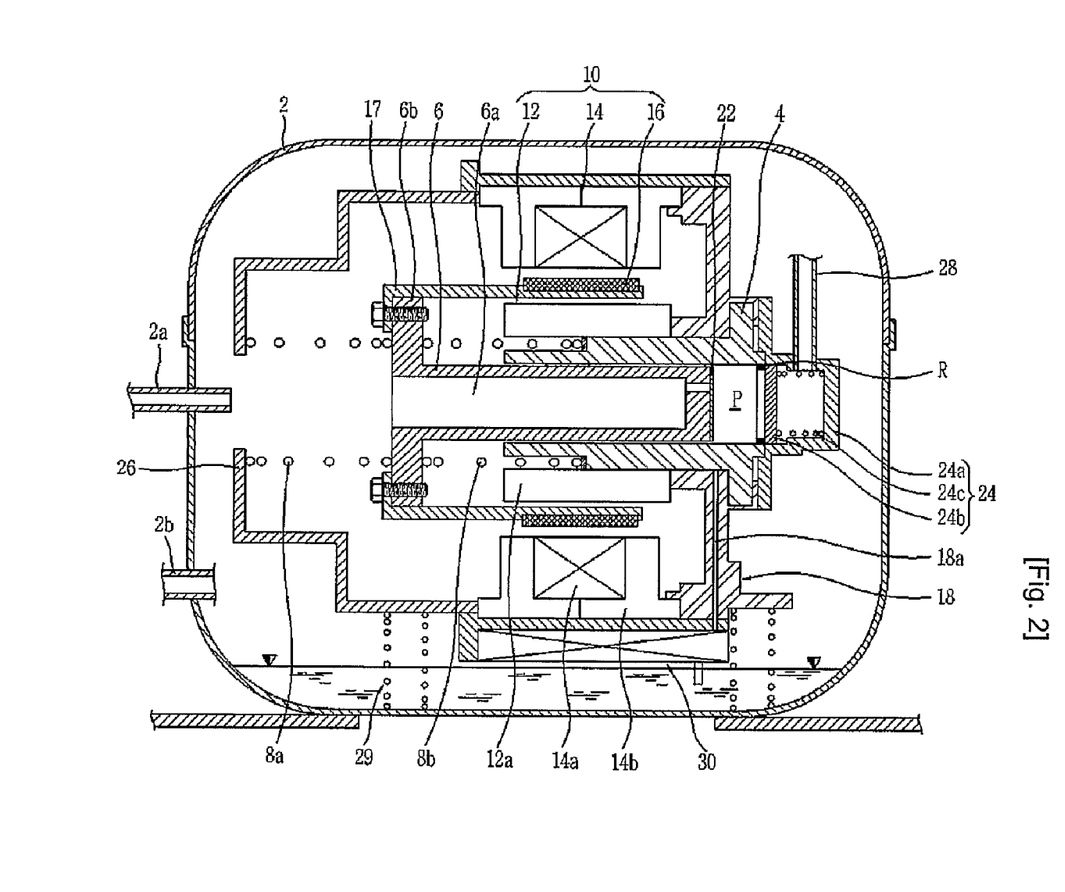
FIG. 2 is a cross-sectional view illustrating a linear compressor in accordance with the present invention.

As illustrated in FIG. 2, in the linear compressor, an inflow tube 2a and an outflow tube 2b for sucking and discharging refrigerants are installed at one side of a hermetic container 2, a cylinder 4 is fixedly installed in the hermetic container 2, a piston 6 is linearly reciprocated in the cylinder 4, for compressing the refrigerants sucked into a compression space P in the cylinder 4, and various springs elastically support the piston 6 in its motion direction. The piston 6 is connected to a linear motor 10 for generating a linear reciprocation driving force.

A suction valve 22 is installed at one end of the piston 6 contacting the compression space P. A discharge valve assembly 24 is installed at one end of the cylinder 4 contacting the compression space P. The suction valve 22 and the discharge valve assembly 24 are automatically opened and closed according to an inner pressure of the compression space P, respectively.

The hermetic container 2 is installed by hermetically coupling upper and lower shells. The inflow tube 2a for sucking the refrigerants and the outflow tube 2b for discharging the refrigerants are installed at one side of the hermetic container 2. The piston 6 is elastically supported in its motion direction inside the cylinder 4 for linear reciprocation, and the linear motor 10 is coupled to a frame 18 outside the cylinder 4, thereby forming an assembly. This assembly is elastically supported on the inner bottom surface of the hermetic container 2 by support springs 29.

A predetermined amount of oil is filled on the inner bottom surface of the hermetic container 2. An oil pumping device 30 for pumping the oil is installed at the bottom end of the assembly. An oil supply tube 18a is formed in the frame 18 disposed at the lower portion of the assembly, for supplying the oil to the gap between the piston 6 and the cylinder 4. The oil supply device 30 is operated by vibration generated by the linear reciprocation of the piston 6, for pumping the oil. The oil is supplied to the gap between the piston 6 and the cylinder 4 through the oil supply tube 18a, for performing cooling and lubrication.

The cylinder 4 is formed in a hollow shape, so that the piston 6 can be linearly reciprocated in the cylinder 4. The compression space P is formed at one side of the cylinder 4. In a state where one end of the cylinder 4 approaches the inner portion of the inflow tube 2a, the cylinder 4 is preferably installed on the same straight line with the inflow tube 2a. The piston 6 is installed inside one end of the cylinder 4 close to the inflow tube 2a for linear reciprocation. The discharge valve assembly 24 is installed at one end of the cylinder 4 opposite to the inflow tube 2a.

The discharge valve assembly 24 includes a discharge cover 24a installed at one end of the cylinder 4, for forming a discharge space, a discharge valve 24b for opening and closing one end of the cylinder 4 close to the compression space P, and a valve spring 24c, which is a kind of coil spring, for applying an elastic force in the axial direction between the discharge cover 24a and the discharge valve 24b. An O-ring is inserted onto the inner circumference of one end of the cylinder 4, so that the discharge valve 24a can be closely adhered to one end of the cylinder 4.

A loop pipe 28 is curvedly installed between one side of the discharge cover 24a and the outflow tube 2b. The loop pipe 28 guides the compressed refrigerants to be externally discharged, and buffers the vibration generated by the interactions of the cylinder 4, the piston 6 and the linear motor 10 and transferred to the whole hermetic container 2.

When the piston 6 is linearly reciprocated in the cylinder 4, if a pressure of the compression space P is over a predetermined discharge pressure, the valve spring 24c is compressed to open the discharge valve 24b. After the refrigerants are discharged from the compression space P, the refrigerants are completely externally discharged through the loop pipe 28 and the outflow tube 2b.

A refrigerant passage 6a is formed at the center portion of the piston 6, so that the refrigerants sucked through the inflow tube 2a can pass through the refrigerant passage 6a. The linear motor 10 is connected directly to one end of the piston 6 close to the inflow tube 2a by a connection member 17, and the suction valve 22 is installed at the other end of the piston 6 opposite to the inflow tube 2a. The piston 6 is elastically supported in its motion direction by various springs.

The suction valve 22 is formed in a thin plate shape with its center portion partially cut to open and close the refrigerant passage 6a of the piston 6. One side of the suction valve 22 is fixed to one end of the piston 6 by using screws.

Accordingly, when the piston 6 is linearly reciprocated inside the cylinder 4, if the pressure of the compression space P is below a predetermined suction pressure lower than the discharge pressure, the suction valve 22 is opened and the refrigerants are supplied into the compression space P, and if the pressure of the compression space P is over the predetermined suction pressure, the suction valve 22 is closed and the refrigerants are compressed in the compression space P.

Especially, the piston 6 is elastically supported in its motion direction. In detail, a piston flange 6b radially protruded from one end of the piston 6 close to the inflow tube 2a is elastically supported in the motion direction of the piston 6 by mechanical springs 8a and 8b such as coil springs. In addition, the refrigerants filled in the compression space P in the opposite direction to the inflow tube 2a are operated as a gas spring by a self elastic force, for elastically supporting the piston 6.

The mechanical springs 8a and 8b have a constant mechanical spring constant $K_m$ regardless of a load. Preferably, the mechanical springs 8a and 8b are installed at a support frame 26 fixed to the linear motor 10 and the cylinder 4, respectively, in the axial direction with the piston flange 6b therebetween. The mechanical springs 8a supported on the support frame 26 and the mechanical springs 8b installed in the cylinder 4 have the same mechanical spring constant $K_m$.

Figure 3:
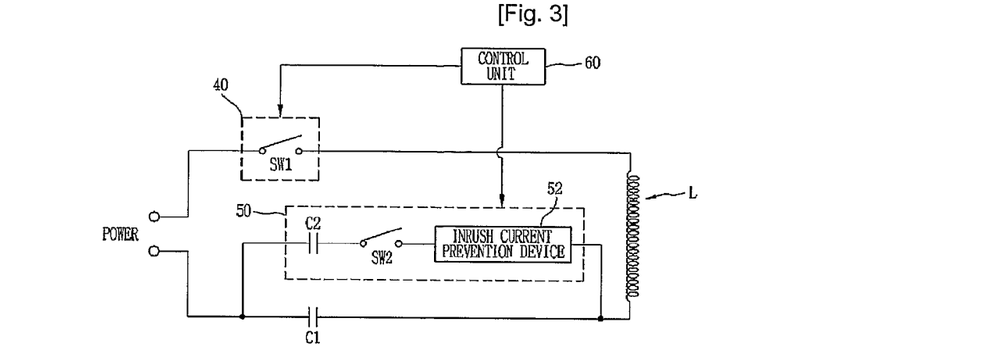
FIG. 3 is a circuit view illustrating a control apparatus for a linear compressor in accordance with a first embodiment of the present invention.

FIG. 3 is a circuit view illustrating a control apparatus for a linear compressor in accordance with a first embodiment of the present invention.

Still referring to FIG. 2, the linear motor 10 includes an inner stator 12 formed by laminating a plurality of laminations 12a in the circumferential direction, and fixed to the outer portion of the cylinder 4 by the frame 18, an outer stator 14 formed by laminating a plurality of laminations 14b in the circumferential direction around a coil winding body 14a formed by winding a coil, and installed at the outer portion of the cylinder 4 by the frame 18 with a predetermined gap from the inner stator 12, and a permanent magnet 16 disposed at the gap between the inner stator 12 and the outer stator 14, and connected to the piston 6 by the connection member 17. The coil winding body 14a can be fixed to the outer portion of the inner stator 12.

As shown in FIG. 3, the control apparatus for the linear compressor includes an on/off switch SW1 40 for receiving power and supplying power to the linear motor 10, a coil winding body L (identical to the coil winding body 14a of FIG. 2) wound in the circumferential direction of the linear compressor, a capacitor C1 connected in series to the coil winding body L, a capacitance varying unit 50 connected in parallel to the capacitor C1, and a control unit 60 for controlling the capacitance varying unit 50 to change an output of the linear compressor.

In detail, the on/off switch SW1 40 is a main switch for applying power to the linear motor 10 by the control of the control unit 60. Here, the power means external commercial power, or power applied from a power supply unit of a linear compressor mounted apparatus (for example, a refrigerator, etc.).

The capacitor C1 and the capacitance varying unit 50 determine the whole capacitance of the linear motor 10, and are connected in parallel as shown in FIG. 3.

The capacitance varying unit 50 is formed by connecting a capacitor C2, a capacitor switch SW2 and an inrush current prevention device 52 in series. The capacitance varying unit 50 can be provided in a multiple number and connected in parallel to the capacitor C1.

The capacitor C2 has a smaller capacitance than the capacitor C1. The capacitor switch SW2 applies a current or voltage from the power supply source to the coil winding body L through the capacitor C2. When the control unit 60 controls the capacitance varying unit 50, it means that the control unit 60 controls on/off of the capacitor switch SW2.

In a state where the on/off switch SW1 40 is closed, if the capacitor switch SW2 is turned on, an inrush current of making electric charges charged in the capacitor C1 instantaneously flow into the capacitor C2 is generated, to deposit a contact point of the capacitor switch SW2. The inrush current prevention device 52 is provided to prevent the capacitor switch SW2 from being damaged by the inrush current. Therefore, the inrush current prevention device 52 includes at least one of a resistor, a negative temperature coefficient (NTC) device and an inductor to convert the inrush current into a different type of energy or prevent the inrush current from being excessively applied to the capacitor switch SW2.

The control unit 60 varies the whole capacitance of the linear motor 10 by controlling the capacitance varying unit 50. That is, the control unit 60 changes the output of the linear compressor, namely, the cooling force by varying the capacitance and also varying an operating frequency by the coil winding body L. Especially, the output size of the linear compressor must be varied according to a load. However, the output of the linear compressor can be increased or decreased regardless of the load. The control operation of the control unit 60 for changing the output and preventing the inrush current will later be explained with reference to FIGS. 5 and 6.

Figure 4:
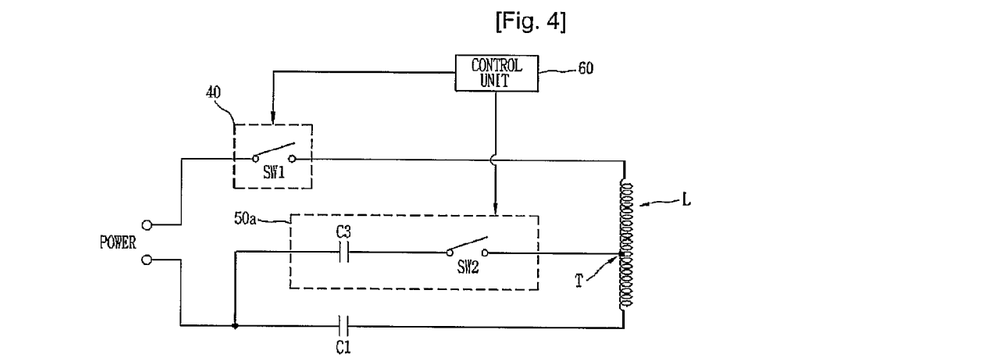
FIG. 4 is a circuit view illustrating a control apparatus for a linear compressor in accordance with a second embodiment of the present invention.

FIG. 4 is a circuit view illustrating a control apparatus for a linear compressor in accordance with a second embodiment of the present invention.

As depicted in FIG. 4, the control apparatus for the linear compressor includes an on/off switch SW1 40 for receiving power and supplying power to the linear motor 10, a oil winding body L (identical to the coil winding body 14a of FIG. 2) wound in the circumferential direction of the linear compressor, a capacitor C1 connected in series to the coil winding body L, a capacitance varying unit 50a having one end connected to one end of the capacitor C1 and the other end connected to a winding tap T of the coil winding body L, the capacitance varying unit 50a being connected in parallel to the capacitor C1, and a control unit 60 for controlling the capacitance varying unit 50a to change an output of the linear compressor.

Here, the on/off switch SW1 40, the coil winding body L and the capacitor C1 of FIG. 4 are identical to those of FIG. 3 with the same reference numerals.

The capacitance varying unit 50a of FIG. 4 is formed by connecting a capacitor C3 and a capacitor switch SW2 in series. Differently from the capacitance varying unit 50 of FIG. 3, the capacitance varying unit 50a of FIG. 4 does not include the inrush current prevention device 52. The other end of the capacitance varying unit 50a is connected directly to the winding tap T of the coil winding body L, so that the coil between the capacitor C1 and the winding tap T can serve as an inductor. Even if an inrush current is generated, the inrush current does not damage the capacitor switch SW2. That is, the inrush current prevention device 52 of FIG. 3 is not necessary by connecting the capacitance varying unit 50a to the coil winding body L. As a result, the area occupied by the linear motor 10 is reduced and the production cost is cut down. For example, a resistor consumes the inrush current by heat emission. As the heat emission by the current is continuously performed during the operation, the temperature of the linear motor 10 is raised. In addition, when an ambient temperature is high, a resistance value of an NTC device is reduced not to efficiently intercept the inrush current. Furthermore, since an inductor is relatively large, the inductor occupies a large area in the linear compressor. The aforementioned problems can be solved by connecting the capacitance varying unit 50a to the coil winding body L.

The capacitance varying unit 50a can be provided in a multiple number and connected in parallel to the capacitor C1. Here, one or more winding taps T can be used for the capacitance varying units 50a.

The capacitor C3 is identical to the capacitor C2 of FIG. 3 in the element characteristic (including the size of the capacitance) and the function. When the control unit 60 controls the capacitance varying unit 50a, it means that the control unit 60 controls on/off of the capacitor switch SW2.

The control unit 60 varies the whole capacitance of the linear motor 10 by controlling the capacitance varying unit 50a. That is, the control unit 60 changes the output of the linear compressor, namely, the cooling force by varying the capacitance and also varying an operating frequency by the coil winding body L. Especially, the output size of the linear compressor must be varied according to a load. However, the output of the linear compressor can be increased or decreased regardless of the load. The control operation of the control unit 60 for changing the output and preventing the inrush current will now be explained with reference to FIGS. 5 and 6.

Figure 5:
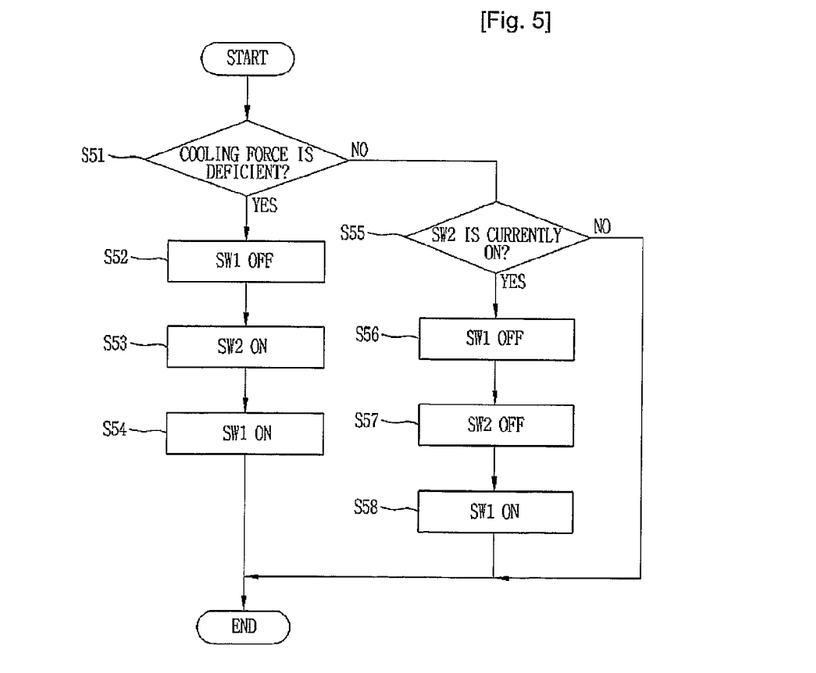
FIG. 5 is a flowchart showing sequential steps of a control method of the control apparatuses of FIGS. 3 and 4 in accordance with a first embodiment of the present invention.

FIG. 5 is a flowchart showing sequential steps of a control method of the control apparatuses of FIGS. 3 and 4 in accordance with a first embodiment of the present invention. At the initial stage, the control unit 60 closes the on/off switch SW1 40 to apply power to the coil winding body L and the capacitor C1, so that the linear compressor can generate a predetermined output.

In step S51, the control unit 60 decides whether the linear compressor needs to generate an additional cooling force. As described above, the cooling force can be required according to the load or regardless of the load. Such a decision is appropriately made in each case. If the cooling force is required (if the high cooling force control is required), the routine goes to step S52, and if not, (if the high cooling force control is not required, namely, if the low cooling force control is maintained, or if the current high cooling force control is ended and the low cooling force control is started), the routine goes to step S55.

In step S52, the control unit 60 turns off (opens) the on/off switch SW1 40. The control unit 60 maintains the off state for a predetermined time (for example, a few seconds), so that the electric charges charged in the capacitor C1 can be consumed to some extent.

In step S53, the control unit 60 turns on (closes) the capacitor switch SW2 by controlling the capacitance varying unit 50 or 50a. The control unit 60 maintains the on state (SW1 is off and SW2 is on), so that the electric charges charged in the capacitor C1 can be almost completely consumed. Such consumption is carried out by the inrush current prevention device 52 or some coil of the coil winding body L.

In step S54, the control unit 60 turns on (closes) the on/off switch SW1 40 to apply power to the capacitor C1 and the capacitance varying unit 50 or 50a (namely, the capacitor C2 or C3). As the whole capacitance increases, the high cooling force operation is performed.

In step S55, the control unit 60 decides whether the capacitor switch SW2 is currently turned on, namely, closed. If the capacitor switch SW2 is turned on (if the high cooling force operation is currently performed), the routine goes to step S56, and if not, the routine is ended, and the current low cooling force operation is maintained as it is.

In step S57, the control unit 60 turns off the on/off switch SW1 40. The control unit 60 maintains the off state for a predetermined time as in step S52. If the control unit 60 omits S57 and performs S58, the inrush current generated by the electric charges charged in the capacitor C2 or C3 flows into the on/off switch SW1 40 and damages the on/off switch SW1 40. Therefore, the step S57 is necessary.

In step S58, the control unit 60 turns off (opens) the capacitor switch SW2. The control unit 60 maintains the open state for a predetermined time, so that the electric charges charged in the capacitor C1 and/or the capacitor C2 or C3, especially in the capacitor C2 or C3 can be consumed.

In step S59, the control unit 60 turns on the on/off switch SW1 40 to apply power through the capacitor C1 and the coil winding body L. As the whole capacitance decreases, the low cooling force operation is performed.

In accordance with the control method of the first embodiment of the present invention, the control unit 60 turns off the on/off switch SW1 40 before varying the whole capacitance by controlling the capacitance varying unit 50 or 50a. Therefore, in addition to the inrush current prevention configuration of FIGS. 3 and 4, the control unit 60 prevents an additional inrush current.

Figure 6:
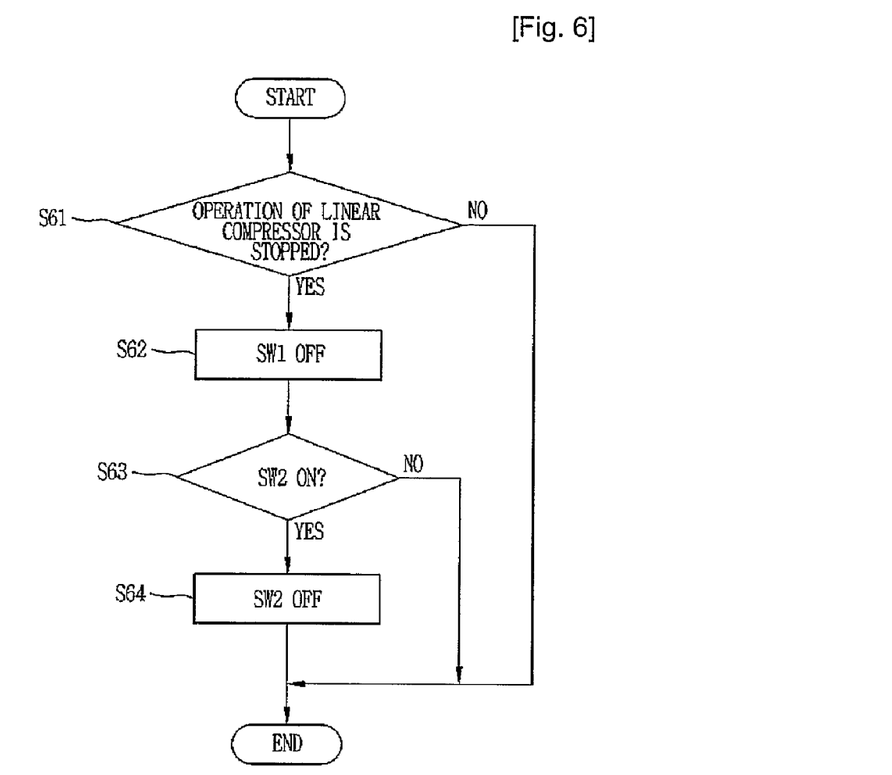
FIG. 6 is a flowchart showing sequential steps of a control method of the control apparatuses of FIGS. 3 and 4 in accordance with a second embodiment of the present invention.

FIG. 6 is a flowchart showing sequential steps of a control method of the control apparatuses of FIGS. 3 and 4 in accordance with a second embodiment of the present invention.

In step S61, the control unit 60 decides whether to stop the linear compressor performing the high cooling force operation or the low cooling force operation. Here, the control unit 60 stops the operation of the linear compressor according to a command from the linear compressor mounted apparatus, or when the cooling force is sufficient. If the control unit 60 intends to stop the operation of the linear compressor, the routine goes to step S62, and if the control unit 60 intends to maintain the current operation of the linear compressor, the routine is ended.

In step S62, the control unit 60 turns off the on/off switch SW1 40 not to apply power to the coil winding body L and the capacitor C1 and/or the capacitor C2 or C3 any more, so that the electric charges charged in the capacitor C1 and/or the capacitor C2 or C3 can be consumed. The control unit 60 maintains the off state of the on/off switch SW1 40 for a predetermined time.

In step S63, the control unit 60 decides whether the capacitor switch SW2 is turned on. If the capacitor switch SW2 is turned on (if the high cooling force operation is currently performed), the routine goes to step S64, and if not (if the low cooling force operation is currently performed), the routine is ended.

In step S64, the control unit 60 turns off the capacitor switch SW2, so that the electric charges charged in the capacitor C2 or C3 and/or the capacitor C1 can be consumed.

As described above, in the case that the control unit 60 stops the operation of the linear compressor, the control unit 60 preferentially turns off the on/off switch SW1 40, and then turns off the capacitor switch SW2, thereby preventing the switch SW2 or SW1 from being damaged by the inrush current.

Figure 7:
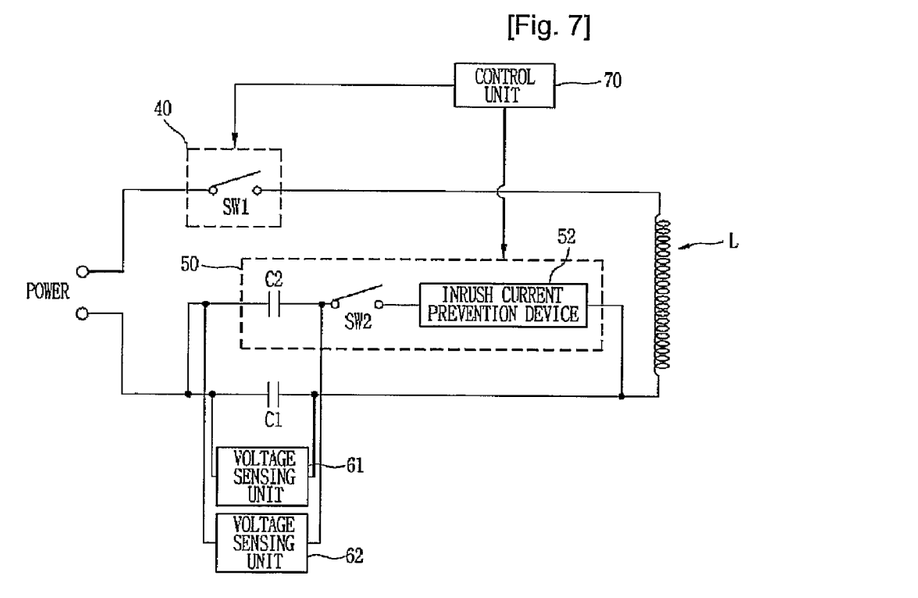
FIG. 7 is a circuit view illustrating a control apparatus for a linear compressor in accordance with a third embodiment of the present invention.

FIG. 7 is a circuit view illustrating a control apparatus for a linear compressor in accordance with a third embodiment of the present invention. As illustrated in FIG. 7, the control apparatus for the linear compressor includes an on/off switch SW1 40 for receiving power and supplying power to the linear motor 10, a coil winding body L (identical to the coil winding body 14a of FIG. 2) wound in the circumferential direction of the linear compressor, a capacitor C1 connected in series to the coil winding body L, a capacitance varying unit 50 connected in parallel to the capacitor C1, voltage sensing units 61 and 62 for sensing both end voltages Vc1 and Vc2 of each of the capacitor C1 and the capacitor C2 (or the capacitance varying unit 50), and a control unit 70 for controlling the capacitance varying unit 50 to change an output of the linear compressor.

Here, the on/off switch SW1 40, the coil winding body L, the capacitor C1 and the capacitance varying unit 50 of FIG. 7 are identical to those of FIG. 3 with the same reference numerals.

When the on/off switch SW1 40 is turned on, the voltage sensing unit 61 senses the both end voltage Vc1 of the capacitor C1. When the on/off switch SW1 40 and the capacitor switch SW2 are turned on, the voltage sensing unit 62 senses the both end voltage of the capacitor C2 or the both end voltage Vc2 of the capacitance varying unit 50. If power applied to the linear motor 10 is varied, the voltage of the varied power directly influences the both end voltages Vc1 and Vc2 of the capacitor C1 and the capacitor C2 or the capacitance varying unit 50. The variation degree of the applied power can be precisely checked by sensing the voltages Vc1 and Vc2. As mentioned above, since the capacitor C1 has a larger capacitance than the capacitor C2, the voltage Vc1 can be used. The both end voltage Vc2 of the capacitance varying unit 50 can also be used.

The control unit 70 varies the whole capacitance of the linear motor 10 by controlling the capacitance varying unit 50. That is, the control unit 70 changes the output of the linear compressor, namely, the cooling force by varying the capacitance and also varying an operating frequency by the coil winding body L. Especially, the control unit 70 recognizes the variation degree of the applied power by the voltage sensing unit 61 or 62. If a sensed voltage Vc (including at least one of Vc1 and Vc2) is lowered (especially in the low cooling force operation), the output decreases. The high cooling force operation is required to maintain the current output. Accordingly, the control unit 70 performs the high cooling force operation. If the sensed voltage Vc is raised (especially in the high cooling force operation), the output increases. The low cooling force operation is required to maintain the current output. Therefore, the control unit 70 performs the low cooling force operation. The control operation of the control unit 70 for changing the output and preventing the inrush current will later be explained with reference to FIG. 9.

Figure 8:
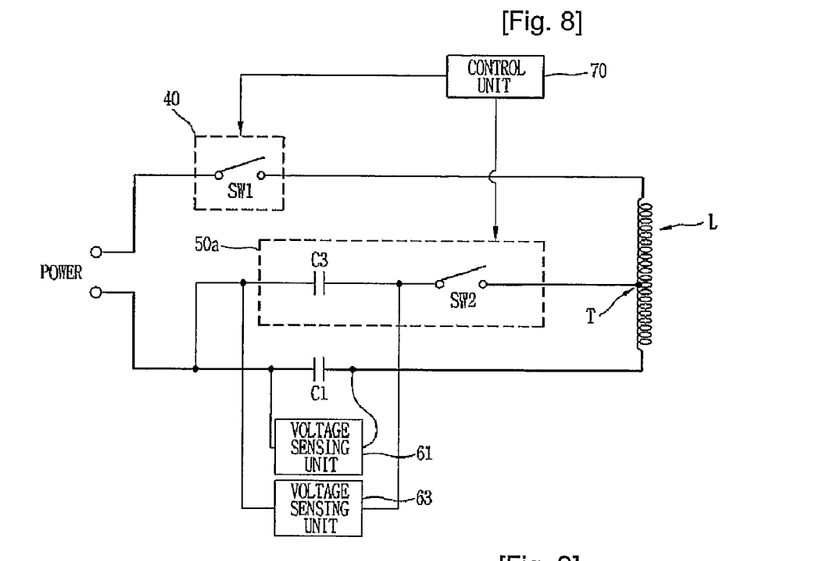
FIG. 8 is a circuit view illustrating a control apparatus for a linear compressor in accordance with a fourth embodiment of the present invention.

FIG. 8 is a circuit view illustrating a control apparatus for a linear compressor in accordance with a fourth embodiment of the present invention. Referring to FIG. 8, the linear motor 10 (namely, the control apparatus for the linear compressor) includes an on/off switch SW1 40 for receiving power and supplying power to the linear motor 10, a coil winding body L (identical to the coil winding body 14a of FIG. 2) wound in the circumferential direction of the linear compressor, a capacitor C1 connected in series to the coil winding body L, a capacitance varying unit 50a having one end connected to one end of the capacitor C1 and the other end connected to a winding tap T of the coil winding body L, the capacitance varying unit 50a being connected in parallel to the capacitor C1, voltage sensing units 61 and 63 for sensing both end voltages Vc1 and Vc3 of each of the capacitor C1 and the capacitor C3 (or the capacitance varying unit 50a), and a control unit 70 for controlling the capacitance varying unit 50a to change an output of the linear compressor.

Here, the on/off switch SW1 40, the coil winding body L, the capacitor C1 and the capacitance varying unit 50a of FIG. 8 are identical to those of FIG. 4 with the same reference numerals.

When the on/off switch SW1 40 is turned on, the voltage sensing unit 61 senses the both end voltage Vc1 of the capacitor C1. When the on/off switch SW1 40 and the capacitor switch SW2 are turned on, the voltage sensing unit 63 senses the both end voltage of the capacitor C3 or the both end voltage Vc3 of the capacitance varying unit 50a. When power applied to the linear motor 10 is varied, the voltage of the varied power directly influences the both end voltages Vc1 and Vc3 of the capacitor C1 and the capacitor C3 or the capacitance varying unit 50a. The variation degree of the applied power can be precisely checked by sensing the voltages Vc1 and Vc3. As described above, since the capacitor C1 has a larger capacitance than the capacitor C3, the voltage Vc1 can be used. The both end voltage Vc3 of the capacitance varying unit 50a or the capacitor C3 can also be used.

The control unit 70 varies the whole capacitance of the linear motor 10 by controlling the capacitance varying unit 50a. That is, the control unit 70 changes the output of the linear compressor, namely, the cooling force by varying the capacitance and also varying an operating frequency by the coil winding body L. Especially, the control unit 70 recognizes the variation degree of the applied power by the voltage sensing unit 61 or 63. If a sensed voltage Vc (including at least one of Vc1 and Vc3) is lowered (especially in the low cooling force operation), the output decreases. The high cooling force operation is required to maintain the current output. Accordingly, the control unit 70 performs the high cooling force operation. If the sensed voltage Vc is raised (especially in the high cooling force operation), the output increases. The low cooling force operation is required to maintain the current output. Therefore, the control unit 70 performs the low cooling force operation. The control operation of the control unit 70 for changing the output and preventing the inrush current will now be explained with reference to FIG. 9.

Figure 9:
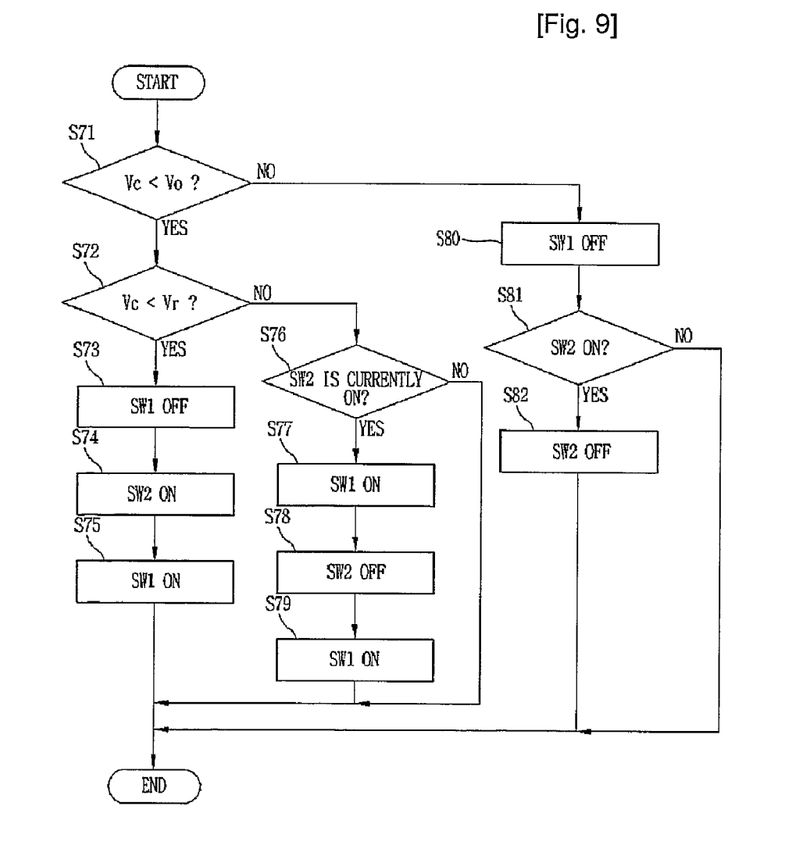
FIG. 9 is a flowchart showing sequential steps of a control method of the control apparatuses of FIGS. 7 and 8.

FIG. 9 is a flowchart showing sequential steps of a control method of the control apparatuses of FIGS. 7 and 8.

At the initial stage, the control unit 70 closes the on/off switch SW1 40 to apply power to the coil winding body L and the capacitor C1, so that the linear compressor can generate a predetermined output. Hereinafter, it is presumed that the control unit 70 uses the both end voltage Vc1 of the capacitor C1 as the voltage Vc.

In step S71, the control unit 70 receives the both end voltage Vc of the capacitor C1 from the voltage sensing unit 61, and compares the both end voltage Vc with an overload voltage Vo. The overload voltage Vo is a prestored value of the control unit 70. The overload voltage Vo indicates that the linear compressor may undergo an overload or perform an abnormal operation, and reflects a value of the Vo-applying power. Therefore, the control unit 70 compares the voltage Vc with the overload voltage Vo. If the voltage Vc is lower than the overload voltage Vo, the routine goes to step S72, and if the voltage Vc is equal to or higher than the overload voltage Vo, the routine goes to step S80 to intercept the applied power.

In step S72, the control unit 70 checks whether the power applied to the linear compressor has been changed, and performs an operation for maintaining a current cooling force in the following steps S73 to S79. Here, a reference voltage Vr is compared with the voltage Vc. The reference voltage Vr means an optimum size voltage for enabling the control unit 70 to stably perform the high and low cooling force operations. In the case that the applied power is varied from 187 to 250V, the reference voltage Vr is set to have one value, for example, 220V, or set within a predetermined range (200 to 240V). In step S72, if the voltage Vc is lower than the reference voltage Vr, the output decreases. To solve this problem, the control unit 70 goes to step S73 for the high cooling force operation. If the voltage Vc is equal to or higher than the reference voltage Vr, the output increases. To prevent this, the control unit 70 goes to step S76 for the low cooling force operation.

In step S73, the control unit 70 turns off (opens) the on/off switch SW1 40. The control unit 70 maintains the off state for a predetermined time (for example, a few seconds), so that the electric charges charged in the capacitor C1 can be consumed to some extent.

In step S74, the control unit 70 turns on (closes) the capacitor switch SW2 by controlling the capacitance varying unit 50 or 50a. The control unit 60 maintains the on state (SW1 is off and SW2 is on), so that the electric charges charged in the capacitor C1 can be almost completely consumed. Such consumption is carried out by the inrush current prevention device 52 or some oil of the coil winding body L.

In step S75, the control unit 70 turns on (closes) the on/off switch SW1 40 to apply power to the capacitor C1 and the capacitance varying unit 50 or 50a (namely, the capacitor C2 or C3). As the whole capacitance increases, the high cooling force operation is performed.

In step S76, the control unit 70 decides whether the capacitor switch SW2 is currently turned on, namely, closed. If the capacitor switch SW2 is turned on (if the high cooling force operation is currently performed), the routine goes to step S77, and if not, the routine is ended, and the current low cooling force operation is maintained as it is.

In step S77, the control unit 70 turns off the on/off switch SW1 40. The control unit 70 maintains the off state for a predetermined time as in step S73. If the control unit 70 omits S77 and performs S78, the inrush current generated by the electric charges charged in the capacitor C2 flows into the on/off switch SW1 40 and damages the on/off switch SW1 40. Therefore, the step S77 is necessary.

In step S78, the control unit 70 turns off (opens) the capacitor switch SW2. The control unit 70 maintains the open state for a predetermined time, so that the electric charges charged in the capacitor C1 and/or the capacitor C2 or C3, especially in the capacitor C2 or C3 can be consumed. In the case that the plurality of capacitance varying units 50 or 50a are connected in parallel, the control unit 70 opens or closes each capacitor switch SW2, thereby variously varying the capacitance.

In step S79, the control unit 70 turns on the on/off switch SW1 40 to apply power through the capacitor C1 and the coil winding body L. As the whole capacitance decreases, the low cooling force operation is performed.

In step S80, the control unit 70 turns off the on/off switch SW1 40 not to apply power to the coil winding body L and the capacitor C1 and/or the capacitor C2 or C3 any more, so that the electric charges charged in the capacitor C1 and/or the capacitor C2 or C3 can be consumed. The control unit 70 maintains the off state of the on/off switch SW1 40 for a predetermined time.

In step S81, the control unit 70 decides whether the capacitor switch SW2 is turned on. If the capacitor switch SW2 is turned on (if the high cooling force operation is currently performed), the routine goes to step S82, and if not (if the low cooling force operation is currently performed), the routine is ended.

In step S82, the control unit 70 turns off the capacitor switch SW2, so that the electric charges charged in the capacitor C2 or C3 and/or the capacitor C1 can be consumed.

In accordance with the above control method of the present invention, the control unit 70 turns off the on/off switch SW1 40 before varying the whole capacitance by controlling the capacitance varying unit 50 or 50a. As a result, in addition to the inrush current prevention configuration of FIGS. 7 and 8, the control unit 70 prevents an additional inrush current.

In the case that the control unit 70 stops the operation of the linear compressor, the control unit 70 preferentially turns off the on/off switch SW1 40, and then turns off the capacitor switch SW2, thereby preventing the switch SW2 or SW1 from being damaged by the inrush current.

Figure 10:
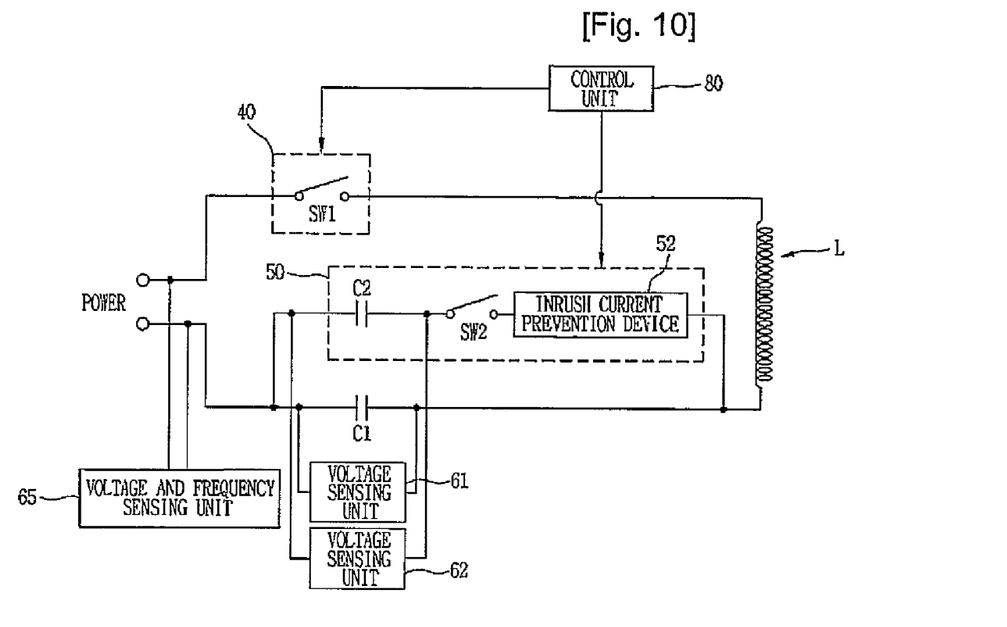
FIG. 10 is a circuit view illustrating a control apparatus for a linear compressor in accordance with a fifth embodiment of the present invention.

FIG. 10 is a circuit view illustrating a control apparatus for a linear compressor in accordance with a fifth embodiment of the present invention. As shown in FIG. 10, the control apparatus for the linear compressor includes an on/off switch SW1 40 for receiving power and supplying power to the linear motor 10, a coil winding body L (identical to the coil winding body 14a of FIG. 2) wound in the circumferential direction of the linear compressor, a capacitor C1 connected in series to the coil winding body L, a capacitance varying unit 50 connected in parallel to the capacitor C1, voltage sensing units 61 and 62 for sensing both end voltages Vc1 and Vc2 of each of the capacitor C1 and the capacitor C2 (or the capacitance varying unit 50), a voltage and frequency sensing unit 65 for sensing a voltage Vi and a frequency Fi of the applied power, and a control unit 80 for controlling the capacitance varying unit 50 to change an output of the linear compressor.

Here, the on/off switch SW1 40, the coil winding body L, the capacitor C1, the cap capacitance varying unit 50 and the voltage sensing units 61 and 62 of FIG. 10 are identical to those of FIG. 7 with the same reference numerals.

The voltage and frequency sensing unit 65 senses the voltage Vi and the frequency Fi of the applied power. Here, the voltage Vi and the frequency Fi are factors directly influencing the output of the linear compressor. The voltage and frequency sensing unit 65 must be provided to judge the variation degree of power in consideration of the voltage Vi and the frequency Fi.

The control unit 80 varies the whole capacitance of the linear motor 10 by controlling the capacitance varying unit 50. That is, the control unit 80 changes the output of the linear compressor, namely, the cooling force by varying the capacitance and also varying an operating frequency by the coil winding body L.

Especially, in order to judge the variation degree of the applied power, the control unit 80 computes a mode voltage Vm by a function including the voltage Vi and the frequency Fi from the voltage and frequency sensing unit 65 as factors, and compares the mode voltage Vm with a predetermined reference value a (a is a constant). That is, the mode voltage Vm is computed by the function of the voltage Vi and the frequency Fi. The influences, namely, influence degrees of the voltage Vi and the frequency Fi on the cooling force, namely, the output of the linear compressor may be different. It is thus not reasonable to compare the voltage Vi and the frequency Fi with a reference voltage and a reference frequency, respectively. Various functions such as a linear function and a quadratic function can be used as the function for computing the mode voltage Vm in order to precisely manifest such influence degrees. In this embodiment, the mode voltage Vm is represented by the following formula 2.

$$Vm = Vi + (Fi - b) \times a \qquad \text{Formula 2}$$

Here, a and b are constants with a predetermined size.

In addition, the control unit 80 recognizes the variation degree of the applied power by the voltage sensing unit 61 or 62. If a sensed voltage Vc (including at least one of Vc1 and Vc2) is lower than an overload voltage Vo, the control unit 80 maintains the current output. If the sensed voltage Vc is equal to or higher than the overload voltage Vo, the control unit 80 stops power supply to overcome an overload. The control operation of the control unit 80 for changing the output and preventing the inrush current will later be explained with reference to FIG. 12.

Figure 11:
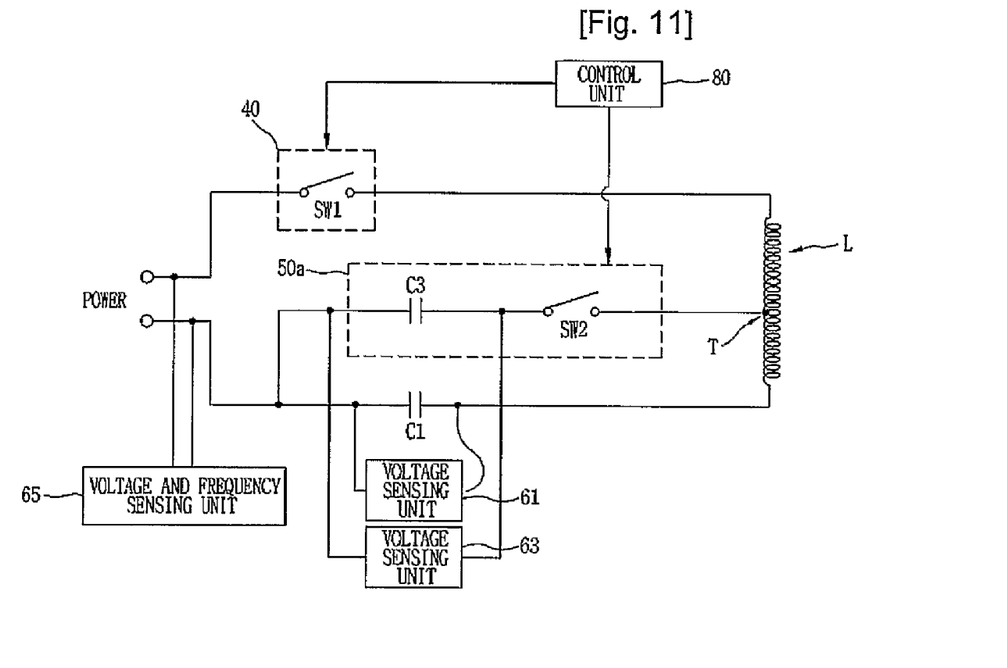
FIG. 11 is a circuit view illustrating a control apparatus for a linear compressor in accordance with a sixth embodiment of the present invention.

FIG. 11 is a circuit view illustrating a control apparatus for a linear compressor in accordance with a sixth embodiment of the present invention. As depicted in FIG. 11, the control apparatus for the linear compressor includes an on/off switch SW1 40 for receiving power and supplying power to the linear motor 10, a coil winding body L (identical to the coil winding body 14a of FIG. 2) wound in the circumferential direction of the linear compressor, a capacitor C1 connected in series to the coil winding body L, a capacitance varying unit 50a having one end connected to one end of the capacitor C1 and the other end connected to a winding tap T of the coil winding body L, the capacitance varying unit 50a being connected in parallel to the capacitor C1, voltage sensing units 61 and 63 for sensing both end voltages Vc1 and Vc3 of each of the capacitor C1 and the capacitor C3 (or the capacitance varying unit 50a), a voltage and frequency sensing unit 65 for sensing a voltage Vi and a frequency Fi of the applied power, and a control unit 80 for controlling the capacitance varying unit 50a to change an output of the linear compressor.

Here, the on/off switch SW1 40, the coil winding body L, the capacitor C1, the capacitance varying unit 50a and the voltage sensing units 61 and 63 of FIG. 11 are identical to those of FIG. 8 with the same reference numerals.

The voltage and frequency sensing unit 65 of FIG. 11 is identical to the voltage and frequency sensing unit 65 of FIG. 10.

The control unit 80 is identical to the control unit 80 of FIG. 10 and operated in the same manner. However, the control unit 80 uses the voltage Vc3 sensed by the voltage sensing unit 63, not the voltage sensing unit 62 of FIG. 10. That is, the control unit 80 recognizes the variation degree of the applied power by the voltage sensing unit 61 or 63. If a sensed voltage Vc (including at least one of Vc1 and Vc3) is lower than an overload voltage Vo, the control unit 80 maintains the current output. If the sensed voltage Vc is equal to or higher than the overload voltage Vo, the control unit 80 stops power supply to overcome an overload. The control operation of the control unit 80 for changing the output and preventing the inrush current will now be explained with reference to FIG. 12.

Figure 12:
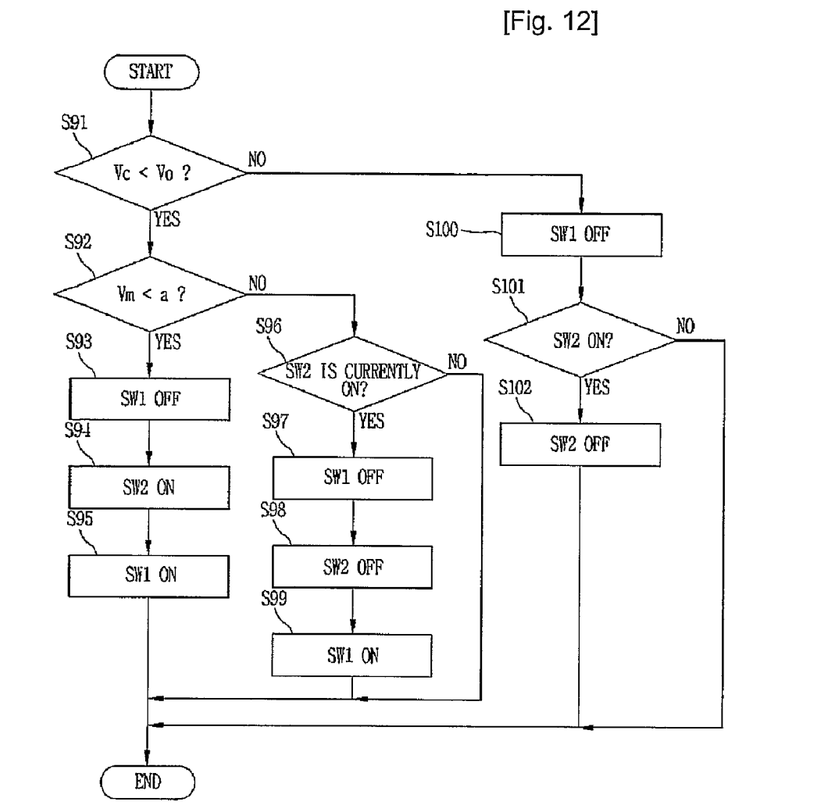
FIG. 12 is a flowchart showing sequential steps of a control method of the control apparatuses of FIGS. 10 and 11.

FIG. 12 is a flowchart showing sequential steps of a control method of the control apparatuses of FIGS. 10 and 11.

At the initial stage, the control unit 80 closes the on/off switch SW1 40 to apply power to the coil winding body L and the capacitor C1, so that the linear compressor can generate a predetermined output. Hereinafter, it is presumed that the control unit 80 uses the both end voltage Vc1 of the capacitor C1 as the voltage Vc.

In step S91, the control unit 80 receives the both end voltage Vc from the voltage sensing unit 61, and compares the both end voltage Vc with the overload voltage Vo. The overload voltage Vo is a prestored value of the control unit 80. The overload voltage Vo indicates that the linear compressor may undergo an overload or perform an abnormal operation, and reflects a value of the Vo-applying power. Therefore, the control unit 80 compares the voltage Vc with the overload voltage Vo. If the voltage Vc is lower than the overload voltage Vo, the routine goes to step S92, and if the voltage Vc is equal to or higher than the overload voltage Vo, the routine goes to step S100 to intercept the applied power.

In step S92, the control unit 80 checks whether the power applied to the linear compressor has been changed, and performs an operation for maintaining a current cooling force in the following steps S93 to S99. Here, the reference value a is compared with the mode voltage Vm. The reference value a means an optimum value for enabling the control unit 80 to stably perform the high and low cooling force operations. The reference value a can be set to have one value, or set within a predetermined range. In step S92, if the mode voltage Vm is smaller than the reference value a, the output decreases. To solve this problem, the control unit 80 goes to step S93 for the high cooling force operation. If the mode voltage Vm is equal to or larger than the reference value a, the output increases. To prevent this, the control unit 80 goes to step S96 for the low cooling force operation.

In step S93, the control unit 80 turns off (opens) the on/off switch SW1 40. The control unit 80 maintains the off state for a predetermined time (for example, a few seconds), so that the electric charges charged in the capacitor C1 can be consumed to some extent.

In step S94, the control unit 80 turns on (closes) the capacitor switch SW2 by controlling the capacitance varying unit 50 or 50a. The control unit 80 maintains the on state (SW1 is off and SW2 is on), so that the electric charges charged in the capacitor C1 can be almost completely consumed. Such consumption is carried out by the inrush current prevention device 52 or some coil of the coil winding body L.

In step S95, the control unit 80 turns on (closes) the on/off switch SW1 40 to apply power to the capacitor C1 and the capacitance varying unit 50 or 50a (namely, the capacitor C2 or C3). As the whole capacitance increases, the high cooling force operation is performed.

In step S96, the control unit 80 decides whether the capacitor switch SW2 is currently turned on, namely, closed. If the capacitor switch SW2 is turned on (if the high cooling force operation is currently performed), the routine goes to step S97, and if not, the routine is ended, and the current low cooling force operation is maintained as it is.

In step S97, the control unit 80 turns off the on/off switch SW1 40. The control unit 80 maintains the off state for a predetermined time as in step S93. If the control unit 80 omits S97 and performs S98, the inrush current generated by the electric charges charged in the capacitor C2 flows into the on/off switch SW1 40 and damages the on/off switch SW1 40. Therefore, the step S97 is necessary.

In step S98, the control unit 80 turns off (opens) the capacitor switch SW2. The control unit 80 maintains the open state for a predetermined time, so that the electric charges charged in the capacitor C1 and/or the capacitor C2 or C3, especially in the capacitor C2 or C3 can be consumed. In the case that the plurality of capacitance varying units 50 or 50a are connected in parallel, the control unit 80 opens or closes each capacitor switch SW2, thereby variously varying the capacitance.

In step S99, the control unit 80 turns on the on/off switch SW1 40 to apply power through the capacitor C1 and the coil winding body L. As the whole capacitance decreases, the low cooling force operation is performed.

In step S100, the control unit 80 turns off the on/off switch SW1 40 not to apply power to the coil winding body L and the capacitor C1 and/or the capacitor C2 or C3 any more, so that the electric charges charged in the capacitor C1 and/or the capacitor C2 or C3 can be consumed. The control unit 80 maintains the off state of the on/off switch SW1 40 for a predetermined time.

In step S101, the control unit 80 decides whether the capacitor switch SW2 is turned on. If the capacitor switch SW2 is turned on (if the high cooling force operation is currently performed), the routine goes to step S102, and if not (if the low cooling force operation is currently performed), the routine is ended.

In step S102, the control unit 80 turns off the capacitor switch SW2, so that the electric charges charged in the capacitor C2 or C3 and/or the capacitor C1 can be consumed.

In accordance with the above control method of the present invention, the control unit 80 turns off the on/off switch SW1 40 before varying the whole capacitance by controlling the capacitance varying unit 50 or 50a. Therefore, in addition to the inrush current prevention configuration of FIGS. 10 and 11, the control unit 80 prevents an additional inrush current.

In the case that the control unit 80 stops the operation of the linear compressor, the control unit 80 preferentially turns off the on/off switch SW1 40, and then turns off the capacitor switch SW2, thereby preventing the switch SW2 or SW1 from being damaged by the inrush current.

Figure 13:
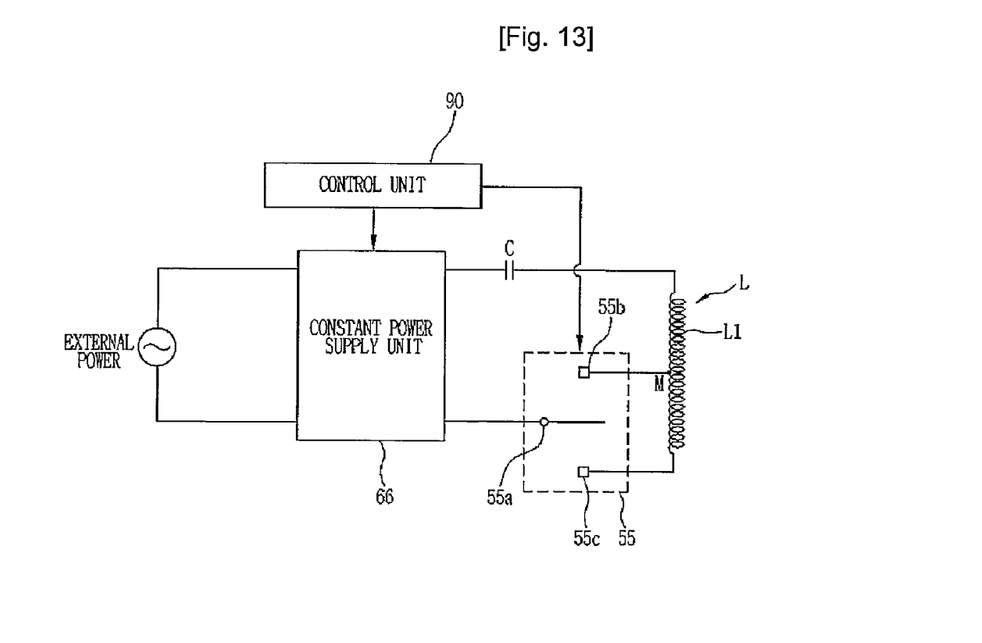
FIG. 13 is a circuit view illustrating a control apparatus for a linear compressor in accordance with a seventh embodiment of the present invention.

FIG. 13 is a circuit view illustrating a control apparatus for a linear compressor in accordance with a seventh embodiment of the present invention. Referring to FIG. 13, the control apparatus for the linear compressor includes a constant power supply unit 66 for receiving external power and converting the power into constant power, a coil winding body L (identical to the coil winding body 14a of FIG. 2) wound in the circumferential direction of the linear compressor, for receiving the constant power to variously vary an inductance, a capacitor C connected in series to the coil winding body L, for receiving the constant power, a branch means 55 for applying power to the part or whole of the coil winding body L, and a control unit 90 for controlling the constant power supply unit 66 and the branch means 55 to adjust a cooling force according to a load.

In detail, the constant power supply unit 66 receives the external power having variation possibility, and applies constant power with a predetermined size of constant voltage, constant power with a predetermined size of constant frequency, or constant power with a predetermined size of constant voltage and a predetermined size of constant frequency to the capacitor C and the coil winding body L. The constant power supply unit 66 can be provided as an electronic circuit using an inverter or a triac.

Here, the size of the constant voltage and the size of the constant frequency are fixed as single values, respectively, so that the constant power supply unit 66 can always apply the constant power with the same size of constant voltage and/or constant frequency. In addition, the constant power supply unit 66 can convert the externally-applied power into constant power with a different size of constant voltage and/or constant frequency by the control of the control unit 90. The constant power supply unit 66 prevents the output from being changed due to variation of the external power having variation possibility, by applying the constant power to the capacitor C and the coil winding body L, and causes the aforementioned natural output change by automatically controlling the reciprocation stroke of the piston 6 according to the load (for example, low load, mid load, high load, overload, etc.). That is, the natural output change is achieved when the reciprocation stroke of the piston 6 in the low load is different from the reciprocation stroke of the piston 6 in the overload. Especially, the piston 6 is preferably reciprocated to the top dead center (TDC) in the overload.

The capacitor C receiving the constant power is connected to one end of the coil winding body L, and a connection terminal 55c of the branch means 55 is formed at the other end of the coil winding body L. A connection terminal 55b is connected to a middle point M (or a branch line of the middle point M) of the coil winding body L.

The capacitor C is a constitutional element for determining the circuit operating frequency $f_c$ of the control apparatus with the coil winding body L. Here, the sizes of the capacitor C and the coil winding body L must be designed so that the operating frequency $f_c$ can be equalized to the natural frequency $f_n$ in the maximum output (for example, the overload operation) of the linear motor 10 (resonant point design). The natural frequency $f_n$ is estimated by considering the mechanical spring constant $K_m$ and the gas spring constant $K_g$, or by decreasing the mechanical spring constant $K_m$ and increasing the influence of the gas spring constant $K_g$. By this design, in the load requiring the maximum output, the piston 6 of the linear motor 10 is reciprocated to the TDC of FIG. 2, and in the load below the maximum output, the piston 6 of the linear motor 10 is reciprocated according to the load.

The branch means 55 includes a switching element 55a connected to the constant power supply unit 66, for selectively applying the constant power to the connection terminal 55b or 55c, and the connection terminals 55b and 55c (or winding taps) connected to the middle point M and the other end of the coil winding body L, respectively, for applying the constant power to the coil winding body L by connection to the switching element 55a. The branch means 55 applies the constant power to the part or whole of the coil winding body L by operating the switching element 55a according to the selection signal of the control unit 90. Here, two or more connection terminals 55b and 55c can be provided. At the initial stage, the branch means 55 connects the switching element 55a to the connection terminal 55c.

The control unit 90 preferentially controls the constant power supply unit 66 to receive the external power, convert the power into a predetermined size of constant power, and apply the constant power to the capacitor C and the coil winding body L. Accordingly, the linear motor 10 can automatically change the output of the piston 6 according to the load.

Figure 14:
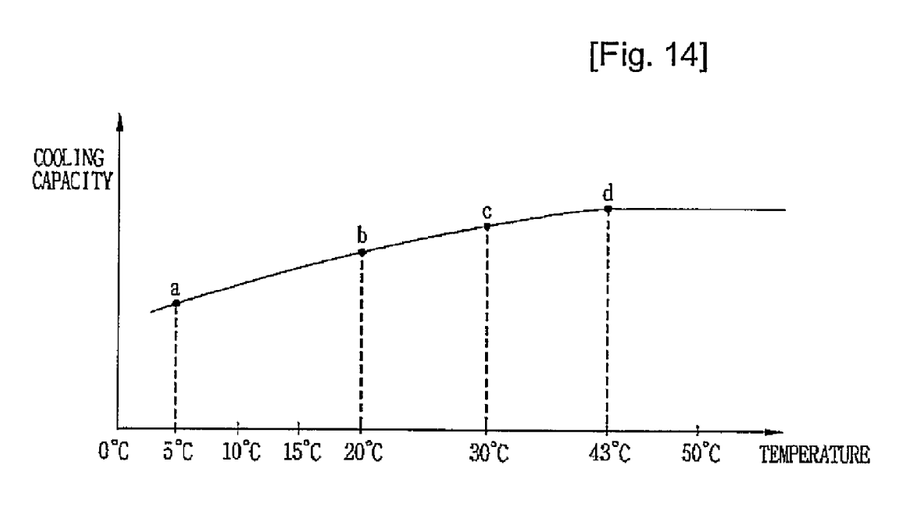
FIG. 14 is a graph showing a cooling capacity of the control apparatus of FIG. 13.

The automatic output change is clearly shown in FIG. 14 which is a cooling capacity graph of the control apparatus of FIG. 13. The cooling capacity graph shows changes of the cooling capacity by a load (a temperature, an ambient temperature, etc.), such as a low load (a), a mid load (b), a high load (c) and an overload (d). Especially, the cooling capacity has an almost constant size after the overload (d). As described above, the piston 6 is reciprocated to the TDC in the overload (d), and reciprocated at a corresponding stroke in the load below the overload (d). In addition to the automatic output change, even if the external power is varied, since the predetermined size of constant power is applied, the cooling capacity graph of FIG. 14 is slowly changed to stably drive the cooling cycle. Besides the automatic output change and the stable cooling cycle, since the circuit operating frequency $f_c$ of the control apparatus is equalized to the natural frequency $f_n$ in the maximum output (overload), the piston 6 is reciprocated to the TDC in the maximum output, thereby maximizing cooling efficiency. In the conventional linear compressor, since the circuit operating frequency $f_c$ is equalized to the natural frequency $f_n$ in the high load output, the cooling capacity is reduced in the maximum output (overload).

The control unit 90 can change the cooling capacity according to a requested output. Here, the requested output means all output variations requested by the cooling cycle or the user. A first method for changing the cooling capacity controls the constant power supply unit 66, and a second method for changing the cooling capacity controls the branch means 55.

The first method for changing the cooling capacity changes the size of the constant power converted in the constant power supply unit 66. For example, in order to increase the output, the control unit 90 increases the size of the constant power converted in the constant power supply unit 66, or decreases the size of the constant frequency. When the output increases, the graph of FIG. 14 upwardly moves (the gradient of the graph can be varied). In order to decrease the output, the control unit 90 decreases the size of the constant power converted in the constant power supply unit 66, or increases the size of the constant frequency. When the output decreases, the graph of FIG. 14 downwardly moves (the gradient of the graph can be varied). On another occasion, the control unit 90 increases the size of the constant frequency to increase the output in the initial cooling operation, and decreases the size of the constant frequency to decrease the output.

The second method for changing the cooling capacity adjusts the length of the coil winding body L receiving the constant power, by controlling the branch means 55. The graph of FIG. 14 is deduced when the switching element 55a of the branch means 55 is connected to the connection terminal 55c. If the control unit 90 connects the switching element 55a to the connection terminal 55b by controlling the branch means 55, the constant power is applied only to the part L1 of the coil winding body L, thereby decreasing the output. Therefore, the graph of FIG. 14 downwardly moves (the gradient of the graph can be varied). That is, if the coil winding body L receiving the constant power is lengthened, the constant power is applied to the whole coil winding body L to increase the output, and if the coil winding body L receiving the constant power is shortened, the constant power is applied to the part of the coil winding body L to decrease the output.

The first and second methods can be individually or cooperatively carried out by the control unit 90, for embodying various output changes.

As discussed earlier, in accordance with the present invention, the control apparatus for the linear compressor can control the output by varying the whole capacitance, and prevent the inrush current.

The control apparatus for the linear compressor can efficiently prevent the inrush current by controlling the on/off switch of the linear compressor in variation of the capacitance.

The linear motor or control apparatus including the plurality of switches can efficiently prevent the inrush current by controlling the on/off order of the switches.

The control apparatus for the linear compressor can improve operation reliability by preventing increase or decrease of the output by variation of the applied power.

The control apparatus for the linear compressor can prevent the linear compressor from undergoing the overload or performing the abnormal operation due to the excessively-applied power.

The control apparatus for the linear compressor can vary the operation of the linear compressor (high cooling force operation, low cooling force operation, etc.), and prevent generation of the inrush current.

The control apparatus for the linear compressor can maximize cooling efficiency by changing the output according to the load, regardless of variation of the externally-applied power.

The control apparatus for the linear compressor can generate the plurality of outputs by changing the size of the constant power applied to the coil according to the requested output.

The control apparatus for the linear compressor can generate the plurality of outputs by changing the size of the constant power and the length of the coil receiving the constant power.

The control apparatus for the linear compressor can improve the cooling capacity and cooling efficiency by reciprocating the piston to the TDC in the maximum output, by using the constant power and the resonant point design in the maximum output.

The linear compressor including the moving magnet type linear motor, and the piston connected to the linear motor and linearly reciprocated in the cylinder, for sucking, compressing and discharging the refrigerants has been explained with reference to the attached drawings. Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A control apparatus for a linear compressor, comprising:
a coil winding body laminated on the linear compressor;
a first capacitor connected in series to the coil winding body;
a capacitance varying unit being formed in a parallel structure to the first capacitor, and having a capacitor switch;
a control unit for inducing an output change of the linear compressor, by varying the whole capacitance of the control apparatus by controlling the capacitor switch; and
an on/off switch for supplying power to the coil winding body,
wherein the control unit operates the on/off switch by turning off the on/off switch in order to prevent inrush current.

2. The control apparatus of claim 1, wherein the capacitance varying unit comprises at least one second capacitor, and the capacitor switch is connected between the second capacitor and a winding tap of the coil winding body, for controlling a current flow.

3. The control apparatus of claim 1, wherein the capacitance varying unit comprises at least one third capacitor and an inrush current prevention device, and the capacitor switch is connected between the third capacitor and the first capacitor, for controlling a current flow.

4. The control apparatus of claim 3, wherein the inrush current prevention device comprises at least one of a resistor, a negative temperature coefficient device and an inductor.

5. The control apparatus of claim 1, comprising a voltage sensing unit for sensing a both end voltage of at least one of the first capacitor and the capacitance varying unit.

6. The control apparatus of claim 5, wherein the control unit controls the capacitor switch according to the voltage sensed by the voltage sensing unit.

7. The control apparatus of claim 1, comprising a voltage and frequency sensing unit for sensing a voltage and a frequency of applied power.

8. The control apparatus of claim 7, wherein the control unit computes a mode voltage by a function of the voltage and the frequency from the voltage and frequency sensing unit, and controls the capacitor switch according to the mode voltage.

9. The control apparatus of claim 6, wherein, when the sensed voltage is higher than an overload voltage, the control unit intercepts power supply by turning off the on/off switch.

10. The control apparatus of claim 9, wherein the control unit additionally turns off the capacitor switch.

11. The control apparatus of claim 1, wherein the control unit turns on the on/off switch after controlling the capacitance varying unit.

12. A control apparatus for a linear compressor, comprising:
a coil winding body laminated on the linear compressor;
a first capacitor connected in series to the coil winding body;
a capacitance varying unit formed in a parallel structure to the first capacitor;
a voltage sensing unit for sensing a both end voltage of at least one of the first capacitor and the capacitance varying unit; and
a control unit for inducing an output change of the linear compressor according to a load, by varying the whole capacitance of the control apparatus by controlling the capacitance varying unit according to the voltage sensed by the voltage sensing unit.

13. The control apparatus of claim 12, wherein the control unit controls the capacitance varying unit by comparing the sensed voltage with a predetermined reference voltage, increases the whole capacitance if the sensed voltage is lower than the reference voltage, and decreases the whole capacitance if the sensed voltage is equal to or higher than the reference voltage.

14. A control apparatus for a linear compressor, comprising:
   a coil winding body laminated on the linear compressor;
   a first capacitor connected in series to the coil winding body;
   a capacitance varying unit formed in a parallel structure to the first capacitor;
   a voltage and frequency sensing unit for sensing a voltage and a frequency of applied power; and
   a control unit for inducing an output change of the linear compressor by varying the whole capacitance of the control apparatus, by computing a mode voltage by a function of the voltage and the frequency of the applied power from the voltage and frequency sensing unit and controlling the capacitance varying unit according to the mode voltage.

15. The control apparatus of claim 14, wherein the mode voltage is computed by the following formula:

$Vm = Vi + (Fi - b) \times a$ ($a$ and $b$ are constants).

16. The control apparatus of either claim 14 or 15, wherein the control unit controls the capacitance varying unit by comparing the mode voltage with a predetermined reference value, increases the whole capacitance if the mode voltage is smaller than the reference value, and decreases the whole capacitance if the mode voltage is equal to or larger than the reference value.

17. A control apparatus for a linear compressor, comprising:
   a coil winding body laminated on the linear compressor;
   a capacitor connected in series to the coil winding body;
   a constant power supply unit for receiving external power, converting the power into a specific size of constant power, and applying the constant power to the coil winding body; and
   a control unit for inducing an output change of the linear compressor according to a load, by controlling the constant power supply unit to supply the specific size of constant power to the coil winding body,
   wherein the constant power supply unit generates the constant power by converting at least one of a voltage and a frequency of the external power into the specific size and an operating frequency by the coil winding body and the capacitor is identical to a natural frequency of the compressor in the maximum output of the linear compressor.

18. The control apparatus of claim 17, wherein the natural frequency is estimated by considering a mechanical spring constant and a gas spring constant, or by decreasing the mechanical spring constant and increasing the influence of the gas spring constant.

19. The control apparatus of claim 17 or claim 18, wherein a plurality of winding taps are connected to the coil winding body,
   the control apparatus further comprising a branch means controlled by the control unit and selectively connected to the plurality of winding taps according to a requested output, for applying the constant power to the part or whole of the coil winding body.

* * * * *